Dec. 6, 1960 G. A. LYON 2,963,323
WHEEL COVER
Filed March 22, 1957 3 Sheets-Sheet 1
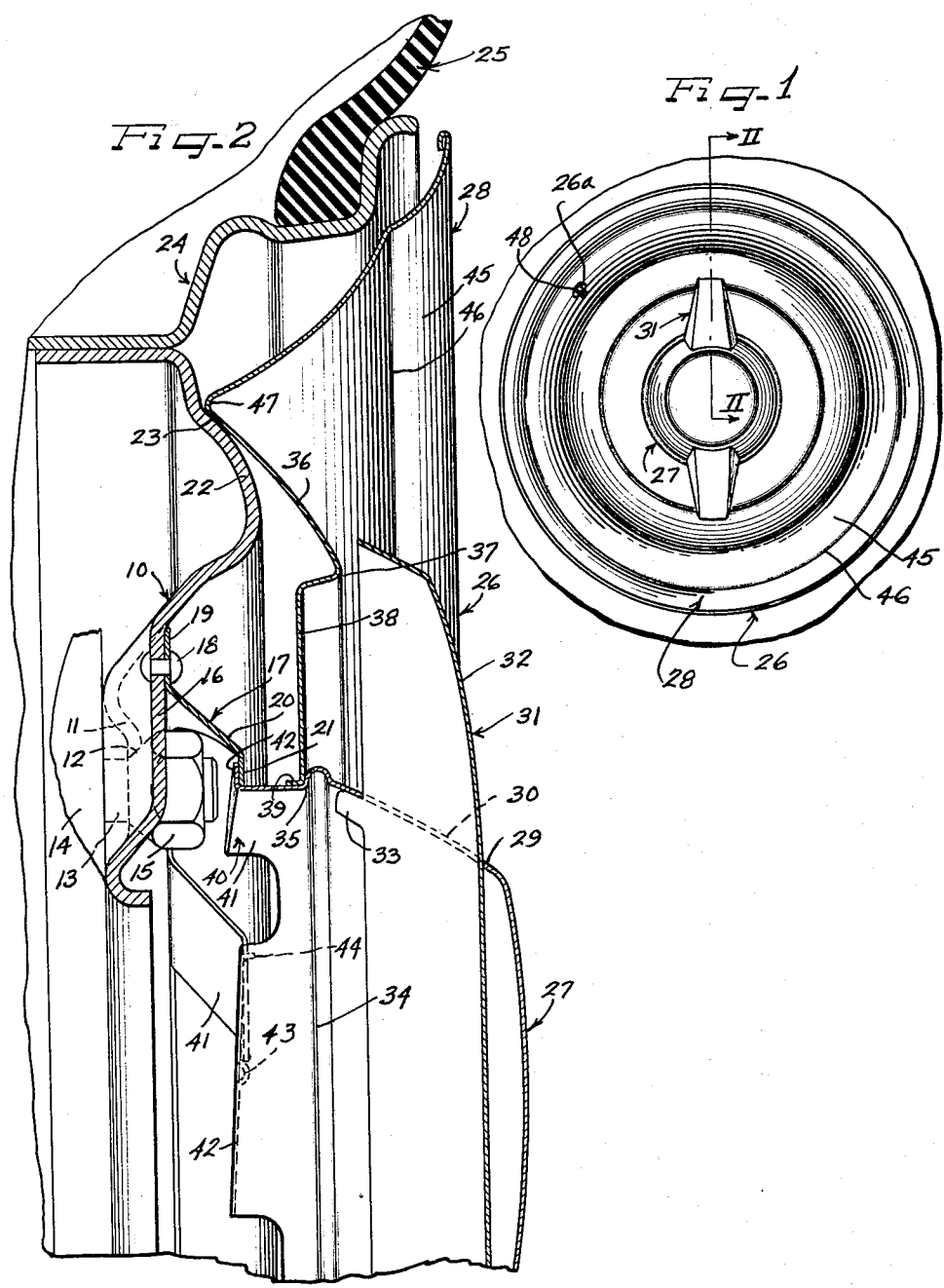
Inventor
GEORGE ALBERT LYON
by Hill, Sherman, Meroni, Gross & Simpson Attys.

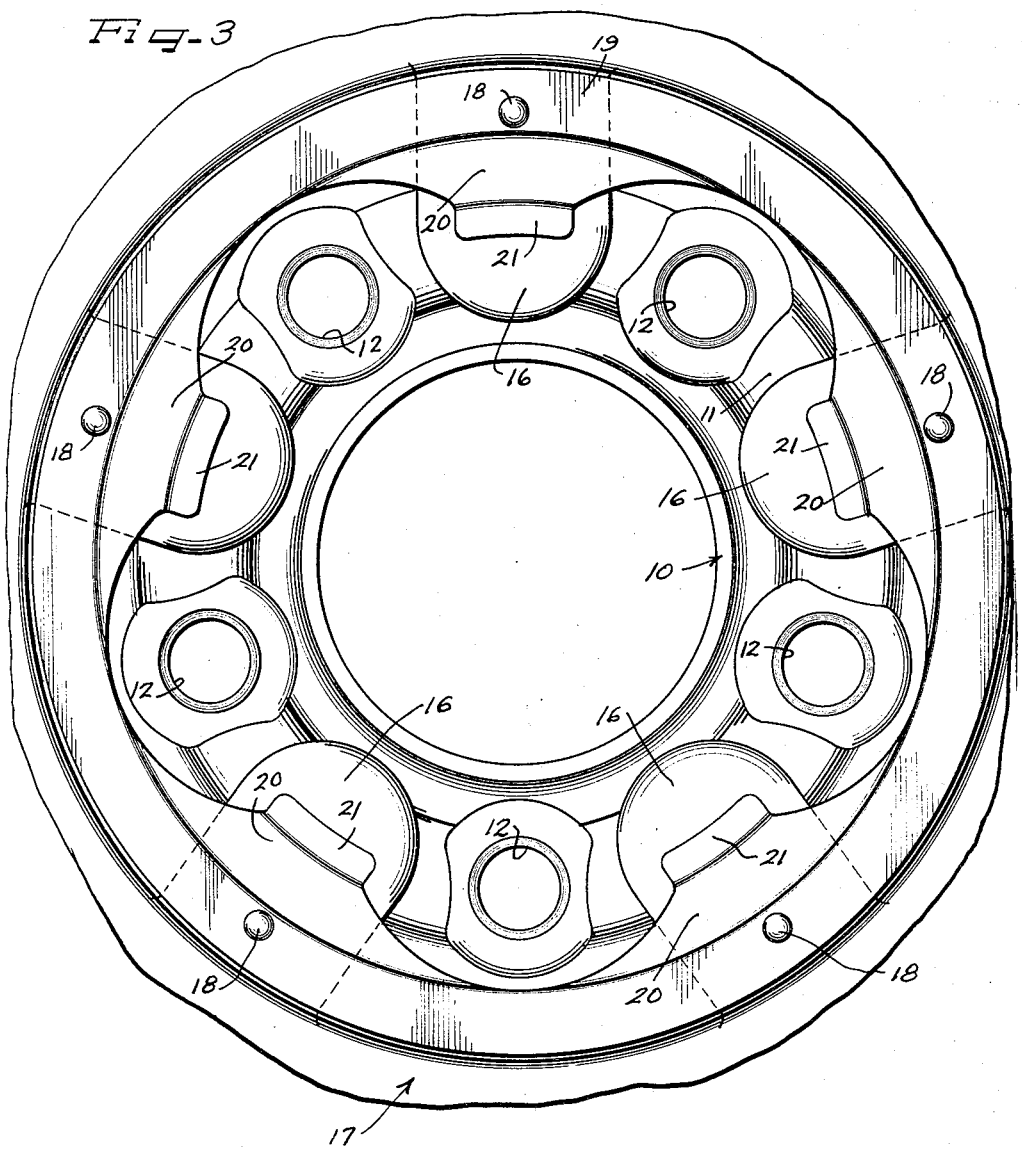

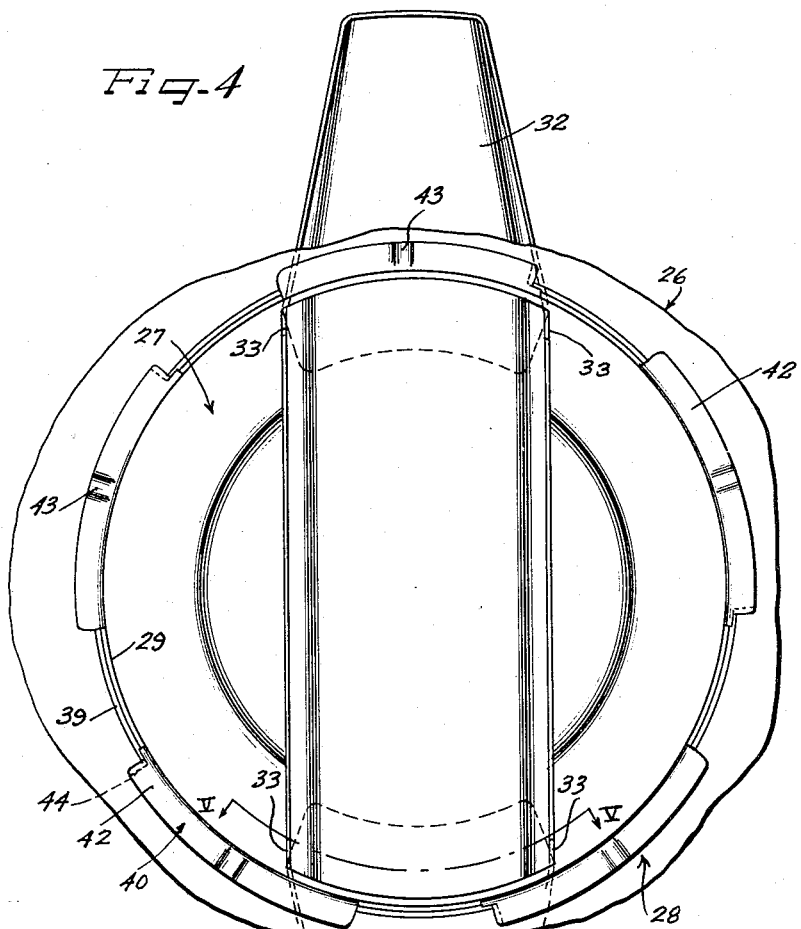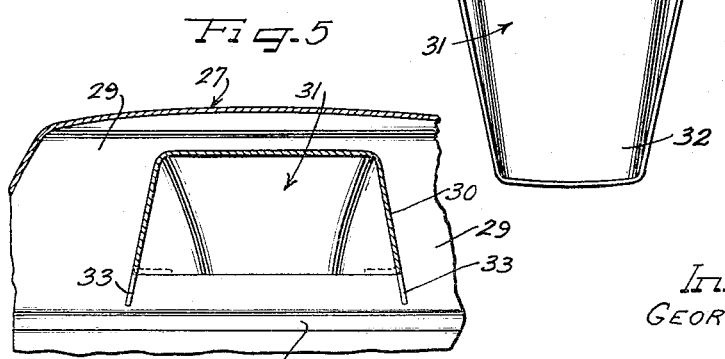

United States Patent Office 2,963,323
Patented Dec. 6, 1960

2,963,323

WHEEL COVER

George Albert Lyon, 13881 W. Chicago Blvd., Detroit 28, Mich.

Filed Mar. 22, 1957, Ser. No. 647,768

6 Claims. (Cl. 301—37)

The present invention relates to improvements in wheel structures and more particularly concerns the ornamental and protective covering for the outer side of a vehicle wheel.

An object of this invention is to provide improved means in a wheel cover assembly simulating a knock-off type of wheel cover assembly wherein a rotary cover member is provided with means to maintain the cover assembly in engagement upon the wheel.

Another object of this invention is to provide a wheel cover assembly having a rotary cover member provided with cover assembly retaining means and upon rotation in one direction being adapted to retain the assembly in engagement with the wheel and upon rotation in an opposite direction being adapted to disengage the cover assembly from the wheel.

Another important object of the present invention is to provide a wheel structure having novel cover means for the outer side thereof with improved retaining structure for the cover.

A further object of the invention is to provide an improved wheel structure having novel cover means for the outer side thereof.

A still further object of the invention is to provide an improved wheel structure having novel means for attaching a wheel cover to the outer side thereof in releasable relation.

Yet another object of the invention is to provide improved quick detachable means for securing a wheel cover to a wheel.

According to the general features of this invention there is provided in a wheel structure including a wheel having rim and body parts, a series of circumferentially spaced stiff radially extending terminals for assembly with the wheel, a wheel cover assembly including inner and outer cover members for overlying disposition upon the wheel with the assembly having circumferentially spaced generally radially extending retaining extensions for cooperation with the terminals upon turning the retaining extensions circumferentially into underlying engagement with the terminals, a handle extending generally radially through the inner cover member in interlocked assembly therewith and with the handle having gripping extensions for turning the retaining extensions into retaining cooperation with the terminals, and retaining means between the cover members maintaining the same in assembly together with the inner cover member being rotatable relative to the outer cover member upon turning of the handle to attach and remove the cover from the wheel.

Other objects, features and advantages of the present invention will be readily apparent from the following detailed description of a preferred embodiment thereof taken in conjunction with the accompanying sheets of drawings, in which:

Figure 1 is a side elevation of a wheel structure embodying features of the present invention;

Figure 2 is an enlarged fragmentary cross sectional view taken substantially on the line II—II of Figure 1 looking in the direction indicated by the arrows;

Figure 3 is an enlarged fragmentary front elevation showing a wheel ring in assembly with a vehicle wheel;

Figure 4 is an enlarged fragmentary rear elevation of the cover assembly; and

Figure 5 is an enlarged fragmentary cross sectional view taken substantially on the line V—V of Figure 4 looking in the direction indicated by the arrows.

According to the present invention, a wheel is provided including a disk spider body 10 including a central dished bolt-on flange 11 having a central aperture 12 through which lugs 13 on an axle hub structure 14 project. Threaded onto the lugs 13 are nuts 15 for clamping the body part into the axle hub structure 14. At circumferentially spaced intervals on the bolt-on flange 11, the flange is bulged axially outwardly to provide circumferentially spaced axially outwardly bulged portions 16. According to features of the present invention, an annular ring 17 is suitably attached by means of rivets 18 to the axially outer side of the body part 10 and more particularly to the axially outwardly bulged portions 16. It will be appreciated that any suitable fasteners may be used to secure the ring 17 to the wheel.

The ring member 17 includes an attachment portion 19, and is provided with circumferentially spaced stiff retaining portions or extensions which include a generally radially inwardly axially outwardly extending wedged shaped portion 20 and a relatively short stiff generally radially inwardly extending terminal 21.

Disposed radially outwardly of the bolt-on flange 11 is an axially outwardly bulged body part portion 22 providing an annular shoulder 23 for purposes which will hereafter be described in detail. Suitably fastened to the body part by welding and the like is a stepped multi-flanged tire rim 24 which carries a conventional tire assembly 25. The tire assembly may be either a tubeless or tube type of tire assembly and in either case has a valve stem 26a for inflation of the same.

Disposed in overlying relation upon the vehicle wheel thus described, and according to still other features of the present invention, is provided my cover assembly 26 including an inner crown or cover member 27 and an outer ring type cover member 28.

The inner cover member 27 is generally dish shaped and includes a generally axially inwardly radially outwardly extending annular side wall 29 having radially spaced openings 30 therein and, according to other features of the present invention, through which extends a handle member 31. It should be noted the handle member 31 extends through the interior area of the dish shaped cover member 27 and has gripping extensions 32, 32 extending radially outwardly of the inner cover member and through the openings 30 in the inner cover member whereby the handle 31 is in interlocked assembly with the inner cover member 27. To insure that the handle does not become disengaged from the inner cover member 27, the handle is provided with deflectable tabs 33 which are adapted to be turned down in the manner shown in Figure 5 to engage against the inner surface of the side wall 29 of the inner cover member 27.

Disposed axially inwardly of the tabs 33 is an annular generally radially outwardly bulged rib 34 which provides an annular seat 35 on the axially inner side of the rib thereof.

The outer cover member or ring member 28 is provided with an inner marginal portion 36 intermediately reinforced by the rib 37. Disposed radially inwardly of the rib 37 is a generally radially extending flange portion 38 terminating in an axially extending flange portion 39 with the flange portions 38 and 39 having an angled juncture which is adapted to engage behind the rib 34 in the seat 35 in such a manner that the inner cover member 27 may be rotated with respect to the outer cover member 28.

The inner cover member 27 is provided with circumferentially spaced retaining portions or extensions 40 each of which includes a generally axially inwardly extending leg portion 41 and terminating in a generally radially outwardly extending retaining extension 42. As is shown in Figure 4, the retaining extensions 42 are each provided with a generally radially extending rib 43 at an intermediate location thereof. The extensions 42 are also provided with axially outwardly turned tabs 44 with the rib 43 and tab 44 defining the sides of a recess in which the radially extending retaining extension 21 is adapted to be lodged when the cover assembly 26 is in assembly with the ring member 17.

The outer ring member 28 also includes an outer marginal portion 45 intermediately reinforced at 46 with the junction of the portions 36 and 45 providing an annular dished ring portion 47 which is adapted to engage against the shoulder 23 of the body part 10 when the cover assembly 26 is engaged upon the wheel.

To assemble the cover assembly 26 upon the wheel, initially, the ring member 17 must be attached to the body part 10. At this point, the inner and outer cover members 26 and 27 may be assembled together such as by means of engaging the ring member portions 38 and 39 axially behind the rib 34 in the seat 35. At this point, the handle member 31 may be moved through the openings 30 in the crown member 27 and the tabs 33 deflected to engage against the side wall 29 thereby interlocking the handle member in assembly with the crown member 27.

The valve stem 26a may either completely underlie the ring member 28 or may extend through valve opening 48 in the outer ring member 28. As shown, the valve stem 26a is adapted to be aligned with respect to the valve opening 48 to enable the cover assembly to be moved axially towards the wheel. At this point, the inner cover member 27 may be rotated so that the extensions 42 are in the spaces between the circumferentially spaced terminals 21. Upon grasping the gripping terminals 32 of the handle 31, the inner cover member 27 may be rotated to cause the extensions 42 to move underneath the terminals 21 with the terminals 21 being flexed over the ribs 43 and engaged in the pockets defined between the ribs 43 and the tabs 44. As the terminals 21 are being engaged with the extensions 42, the annular cover portion 47 on the outer ring member 28 is drawn in tight frictional engagement against the annular shoulder 23 on the body part 10. This action is occasioned as a result of the resilient deflectable character of the inner marginal portion 36 of the ring member 28. It will be appreciated that by frictionally engaging the ring member 28 against the body part 10 the ring member 28 is precluded from rotating thus reducing the likelihood that the valve stem 26a becomes damaged due to rotational movement of the ring member 28.

By virtue of the sliding engagement between the inner cover member 27 and the outer cover member 28, the cover assembly 26 may be very readily removed from the wheel. This result may be brought about by grasping the handles and rotating the inner cover member 27 in an opposite direction to slide the terminals 21 back over the ribs 43 until the terminals 21 are lodged in the spaces between the circumferentially spaced extensions 42. The camming engagement between the terminals 21 and the extensions 42 may be augmented by angling the extensions 42 so that the area of the recess between the rib 43 and the tab 44 is disposed axially outwardly of the opposite side of the extension 42. The inclination of the extension 42 is best shown in Figure 2.

It will be understood that modifications and variations may be effected without departing from the scope of the novel concepts of the present invention.

I claim as my invention:

1. In a wheel cover assembly including an axially extending radially inner hollow crown portion and a radially outer marginal cover portion in assembly together and rotatable relative to one another, retaining means including an annular ring cooperable with the inner crown portion for maintaining the portions in assembly with the wheel, and a handle member extending radially through the inner confines of the hollow crown in assembly therewith and having hand gripping terminals extending radially outwardly and externally of the crown for turning the crown portion for disengaging the retaining means from the wheel, said ring and said cover members and said handle member each comprising an individual stamping with all of the stampings in assembly together.

2. In a wheel cover assembly including an axially extending radially inner hollow crown portion and a radially outer marginal cover portion in assembly together and rotatable relative to one another, retaining means cooperable with the inner crown portion for maintaining the portions in assembly with the wheel, and a handle member extending radially through the inner confines of the hollow crown in assembly therewith and having hand gripping terminals extending radially outwardly and externally of the crown for turning the crown portion for disengaging the retaining means from the wheel, said crown portion having radially opening slots with said hand gripping terminals extending outwardly through the slots in interlocked assembly with the crown portion.

3. In a wheel cover assembly including an axially extending radially inner hollow crown portion and a radially outer marginal cover portion in assembly together and rotatable relative to one another, retaining means cooperable with the inner crown portion for maintaining the portions in assembly with the wheel, a handle member extending radially through the inner confines of the hollow crown in assembly therewith and having hand gripping terminals extending radially outwardly and externally of the crown for turning the crown portion for disengaging the retaining means from the wheel, said crown portion having radially opening slots with said hand gripping terminals extending outwardly through the slots in interlocked assembly with the crown portion, and deflectable tabs between the handle member and the crown portion to prevent radial displacement of the handle member.

4. In a wheel structure including a wheel having rim and body parts, a series of circumferentially spaced stiff radially extending terminals for assembly with the wheel, a wheel cover assembly including inner and outer cover members for overlying disposition upon the wheel with the assembly having circumferentially spaced generally radially extending retaining extensions for cooperation with said terminals upon turning the retaining extensions circumferentially into underlying engagement with said terminals, a handle extending generally radially through the inner cover member in assembly therewith and with said handle having gripping extensions for turning said retaining extensions into retaining cooperation with said terminals, retaining means between the cover members maintaining the same in assembly together with said inner cover member being rotatable relative to the outer cover member upon turning of said handle to attach and remove the cover assembly from the wheel, and a body part engaging area on said outer cover member in frictional co-rotational engagement with the body part upon turning of said handle and inner cover member into retaining engagement with said terminals.

5. In a wheel structure having rim and body parts, a wheel cover assembly including inner and outer cover members for overlying disposition upon the wheel, resilient means between the wheel and the cover assembly for maintaining the cover assembly in resilient tensioned assembly with the body part, said resilient means including a series of circumferentially spaced radially extending terminals for assembly with the wheel, said resilient means further including circumferentially spaced generally radially extending retaining extensions provided on the cover assembly cooperable with said terminals upon turning the retaining extensions circumferentially into underlying engagement with said terminals, the terminals and the retaining extensions being resiliently deflectable relative to one another in tensioned assembly together, a handle extending generally radially through the inner cover member in assembly therewith and with said handle having gripping extensions for turning said retaining extensions into retaining cooperation with said terminals, retaining means between the cover members maintaining the same in assembly together with said inner cover member being rotatable relative to the outer cover member upon turning of said handle to attach and remove the cover assembly from the wheel, and a body part engaging area on said outer cover member in frictional corotational engagement with the body part upon turning of said handle and inner cover member into retaining engagement with said terminals.

6. A cover assembly for disposition over the outer side of a wheel, including a dished crown cover member having a radially outwardly facing side wall, means on said crown cover member for retaining engagement with means on a wheel, an elongated handle member, said side wall having aligned openings therein of a size to receive said handle member therethrough, the handle member extending through the interior of said crown cover member and through said openings and projecting at opposite end portions thereof radially outwardly from said side wall, and means securing the handle against disengagement from the side wall.

References Cited in the file of this patent

UNITED STATES PATENTS

| | | |
|---|---|---|
| 2,276,405 | Lyon | Mar. 17, 1942 |
| 2,305,111 | Schueren et al. | Dec. 15, 1942 |
| 2,680,551 | Brosky | June 8, 1954 |
| 2,729,510 | Lyon | Jan. 3, 1956 |